Figure 1:
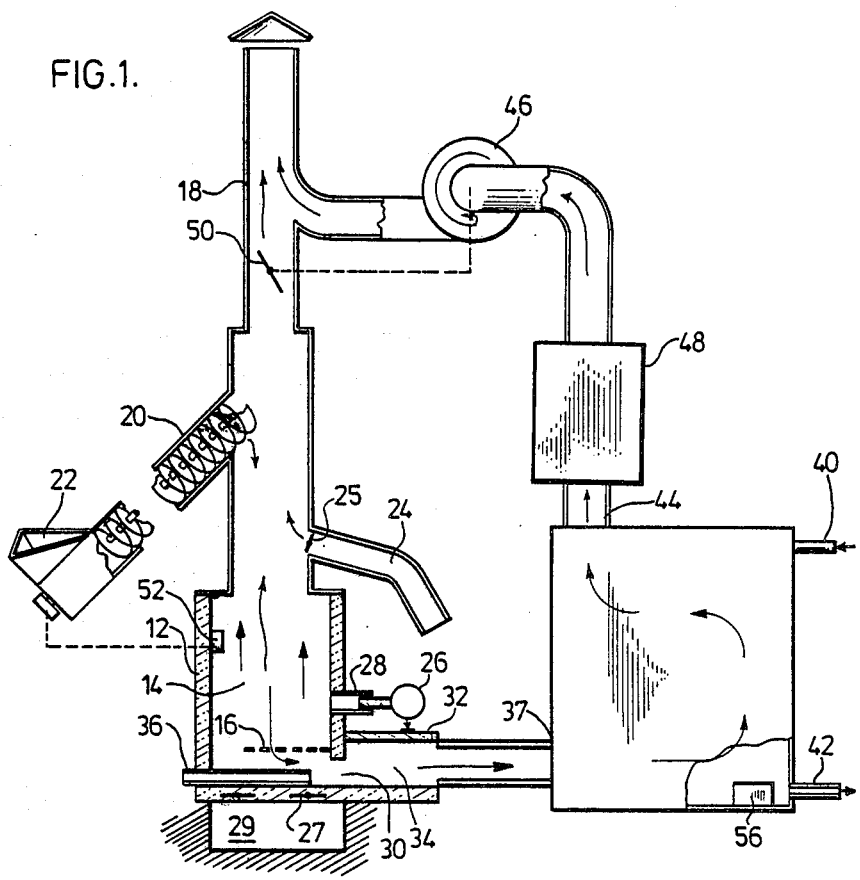

United States Patent [19]

McKinlay

[11] Patent Number: 4,471,702
[45] Date of Patent: Sep. 18, 1984

[54] APPARATUS FOR BURNING WASTE MATERIAL

[76] Inventor: Bruce A. McKinlay, R.R. No. 4, Thamesville, Ontario N0P 2K0, Canada

[21] Appl. No.: 512,303

[22] Filed: Jul. 11, 1983

[51] Int. Cl.³ ............................................. F23G 5/12
[52] U.S. Cl. .................................. 110/210; 110/211; 110/256; 110/315
[58] Field of Search .............. 110/203, 162, 208, 163, 110/209, 210, 211, 214, 248, 251, 254, 256, 315, 316

[56] References Cited

U.S. PATENT DOCUMENTS

| 715,494 | 12/1902 | Maslin et al. | 110/118 |
| 992,198 | 5/1911 | Hurst | 110/315 |
| 1,283,668 | 11/1918 | Cherry | 110/297 |
| 2,146,531 | 2/1939 | Criage | 110/254 |
| 2,678,008 | 5/1954 | Blum et al. | 110/256 |
| 3,496,890 | 2/1970 | LaRue | 110/210 |
| 3,754,869 | 8/1973 | Van Raden | 110/210 |
| 3,861,334 | 1/1975 | Stockman | 110/203 |
| 4,245,569 | 1/1981 | Fallon | 110/162 |

*Primary Examiner*—Henry C. Yuen
*Attorney, Agent, or Firm*—Robert F. Delbridge; Arne I. Fors

[57] ABSTRACT

Apparatus for burning material and utilizing the heat of burning has a primary combustion chamber with an upper portion vented to the atmosphere, the material being fed into the primary combustion chamber. A secondary combustion chamber is in communication with a lower portion of the primary combustion chamber, and air is supplied into the secondary combustion chamber. A fan draws air from the atmosphere into the upper portion of the primary combustion chamber and draws combustion gases downwardly through burning waste material in the primary combustion chamber to cause further combustion of the combustion gases in the secondary combustion chamber. Combustion gases from the primary combustion chamber are vented to the atmosphere from the upper portion of the primary combustion chamber when the fan is not operating.

5 Claims, 4 Drawing Figures

APPARATUS FOR BURNING WASTE MATERIAL

This invention relates to apparatus for burning material and utilizing the heat of combustion. The invention is particularly useful for burning waste material, for example agricultural waste material such as corn cobs or any other readily available and combustible agricultural waste.

Although previous attempts have been made to provide equipment for burning such waste material and utilizing the heat of combustion, for example in a heat exchanger, such known equipment has not for one reason or another been commercially successful.

It is therefore an object of the present invention to provide improved equipment of this kind.

According to the present invention, apparatus for burning material and utilizing the heat of said burning comprises a primary combustion chamber having an upper portion vented to the atmosphere, means for feeding said waste material into the primary combustion chamber, a secondary combustion chamber in communication with a lower portion of the primary combustion chamber, means for supplying air into the secondary cumbustion chamber, fan means operable to draw air from the atmosphere into the upper portion of the primary combustion chamber and to draw combustion gases downwardly through burning waste material in the primary combustion gases in the secondary combustion chamber by air supplied thereto, with combustion gases from the primary combustion chamber venting to the atmosphere from the upper portion of the primary combustion chamber when the fan means is inoperative.

Thus, when the fan means is operating, the combustion gases from the primary combustion chamber flow through the secondary combustion chamber. When the fan means is not operating combustion gases from the primary combustion chamber are vented to the atmosphere from the upper portion thereof. Such an arrangement enables the material to be satisfactorily burned, while at the same time permitting the heat of combustion to be used in any suitable manner.

The apparatus may also include heat exchanger means in communication with the secondary combustion chamber, with the fan means when operating also causing combustion gases from the secondary combustion chamber to pass through the heat exchanger means.

The apparatus may have a chimney extending upwardly from the upper portion of the primary combustion chamber, the means for feeding the waste material being operable to feed the waste material into the chimney for subsequent fall into the primary combustion chamber.

The apparatus may include a perforated grate defining a bottom portion of the primary combustion chamber, with the said air supply means supplying air into the secondary combustion chamber below the grate.

The apparatus may include a first chimney extending upwardly from the upper portion of the primary combustion chamber and operable to supply air to the primary combustion chamber when the fan means is operating and a second chimney surrounding the first chimney and extending from the fan means to cause air passed through the heat exchanger means by the fan means to pass up the second chimney and heat air passing down the first chimney into the primary combustion chamber.

Figure 1A:
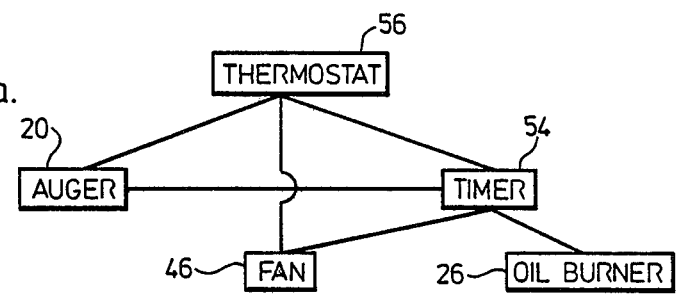
Figure 2:
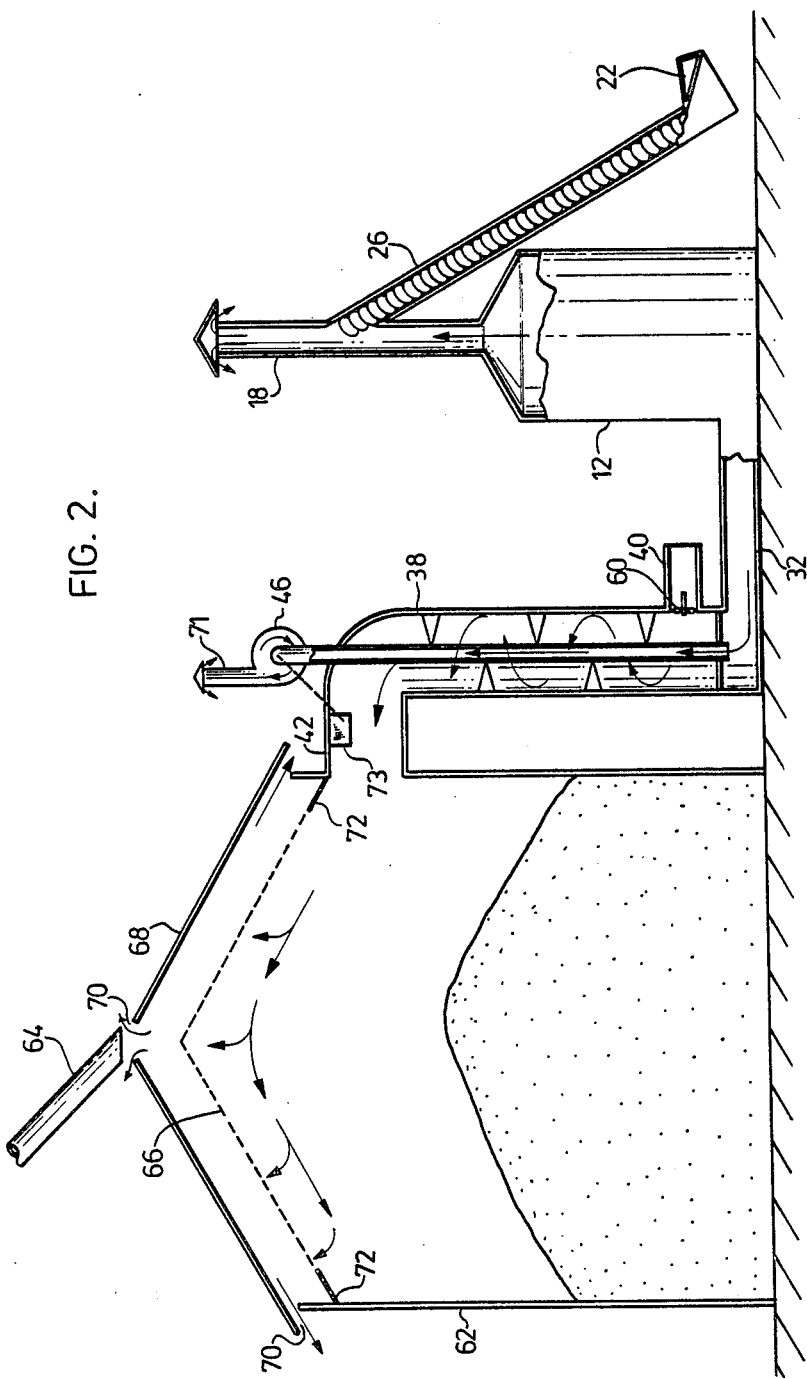
Figure 3:
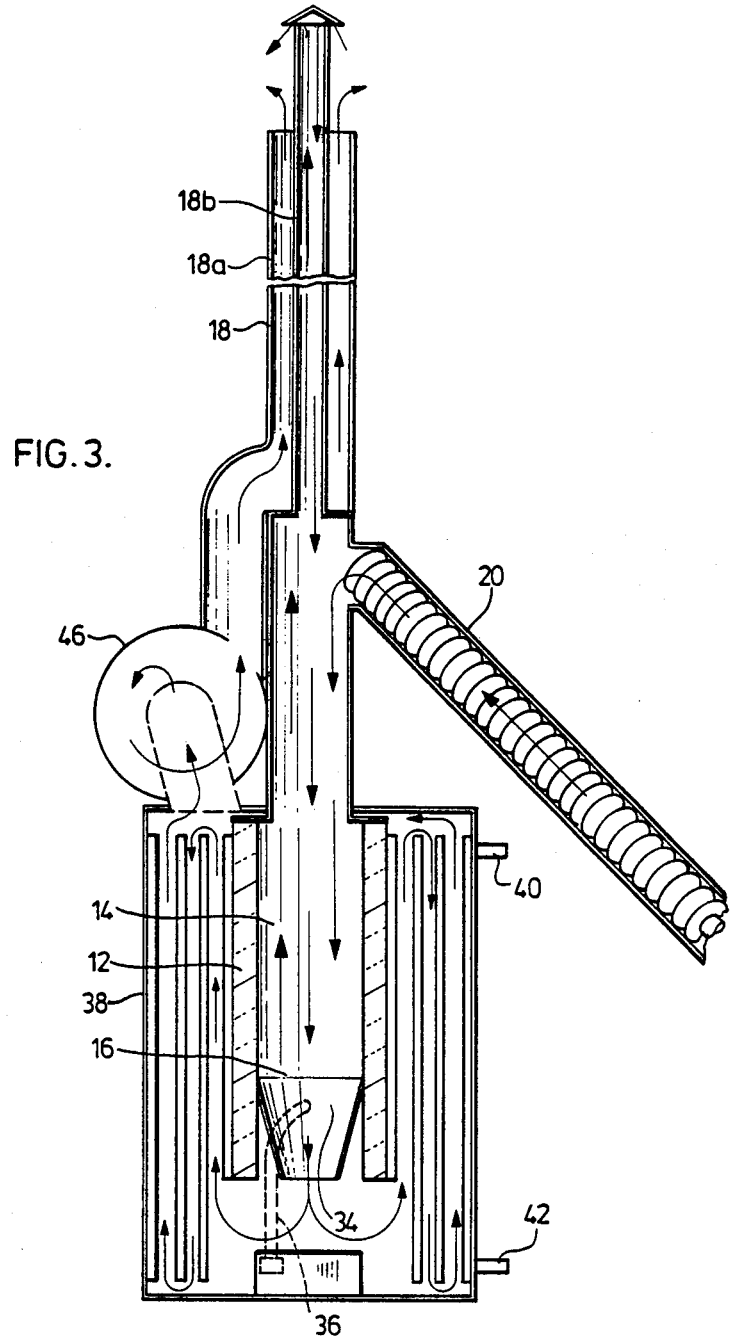

Embodiments of the invention will now be described, by way of example, with reference to the accompanying drawings, of which:

FIG. 1 is a schematic view of apparatus for burning waste material in accordance with one embodiment, FIG. 1A is a diagrammatic view showing automatic controls for use with the embodiment of FIG. 1, FIG. 2 is a schematic view of apparatus in accordance with the second embodiment and FIG. 3 is a similar view of a third embodiment.

Referring first to FIG. 1, apparatus for burning agricultural waste material and utilizing the heat of combustion comprising a housing 12 containing a primary combustion chamber 14. A grate 16 is spaced above the bottom of the housing 12 for supporting the waste material and extends about half way across the housing 12, thereby defining a portion of the bottom of the primary combustion chamber 14. A chimney 18 extends upwardly from the top for venting combustion gases to the atmosphere from the upper portion of the primary combustion chamber 14.

A screw conveyor in the form of an auger 20 extends upwardly from an auger inlet 22 to the chimney 18 just above the housing 12. The auger 20 is operable to discharge waste material into the chimney 18 so that the waste material falls down the chimney into the primary combustion chamber 14 and is supported partly by the grate 16 and partly by the bottom of the housing 12 not covered by the grate 16. Waste material can be fed to the inlet 22 of the auger 20 in any suitable manner, for example from a self-unloading forage wagon. The chimney 18 also has an air inlet 24 near the housing 12 to supply air to the primary combustion chamber 14. The air inlet 24 has a flap valve 25 at its junction with the chimney 18 so that air can enter the chimney from the air inlet 24 with reverse flow being prevented. An oil burner 26 is located adjacent the housing 12 and has an outlet 28 extending through the housing into the primary combustion chamber 14 for initiating combustion therein as will be described later.

Below the grate 16, the housing has an opening 30 in its side wall at the bottom leading to a housing extension 32 forming a secondary combustion chamber 34. A pipe 36 extends from the exterior of the housing 12 across the bottom thereof below the grate 16 to the opening 30 for supplying air to the secondary combustion chamber 30. The bottom of the housing 12 has an ash removal door 27 and an ash pit 29 therebelow.

The housing extension 32 has an outlet leading to the gas inlet 37 of a heat exchanger 38 where combustion gases from the secondary combustion zone 34 can heat a heat exchange fluid (air or water) which is passed through the heat exchanger from an inlet 40 to an outlet 42. The heat exchanger 38 has a combustion gas outlet 44 which leads to the intake of a fan 46 whose outlet is connected to the chimney 18 near the top thereof. If desired, a secondary heat exchanger 48 may be located between the last exchanger 38 and the fan 46. A damper 50 is located in the chimney 18 below the outlet from the fan 46 and above the auger 20 and air inlet 14, the damper 50 being operable to open or close the chimney 18 at this position. The damper 50 is linked to the fan 46 in such a manner that the damper 50 is closed when the fan 46 is operating and vice versa.

The housing 12 contains a level indicator 52 linked to the auger 20 such that the auger 20 is operated as required to maintain a predetermined level of waste material in the housing 12 in a manner which will be readily apparent to a person skilled in the art, it being necessary of course to maintain an adequate supply of waste material to the auger inlet 22, for example by means of the previously mentioned self-unloading forage wagon.

Any suitable agricultural waste material by be burned in the apparatus, such as corn cobs, sawdust, wood chips, broiler manure, straw, etc.

Referring now also to FIG. 1A, the beginning of a cycle is initiated by a timer 54 which causes the auger 20 to operate to feed waste material into the primary combustion chamber 14 up to the predetermined level. At the same time, the oil burner 26 is actuated to cause ignition of the material in the primary combustion chamber 14, and the fan 46 is operated with damper 50 consequently being closed. Combustion gases from the primary combustion chamber 14 are thus drawn down through the burning waste material and the grate 16 and through the opening 30 into the secondary combustion chamber 34. Such operation of the fan 46 also causes air to be drawn into the primary combustion chamber 14 through the air inlet 24 and chimney 18.

From the secondary combustion chamber 34, the combustion gases are drawn by the fan 46 through the heat exchanger 38, through the heat exchanger 48, and then passed by the fan 46 into the chimney 18 above the closed damper 50 so that the combustion gases are then vented to the atmosphere. If desired, the combustion gases may be passed by the fan 46 into a separate chimney, thereby permitting the damper 50 to be dispensed with.

The oil burner 26 is shut off by the timer 54 after an adjustable predetermined time (for example about two minutes) which enables the combustion of the waste material in the primary combustion chamber 14 to have become properly established and to preheat the secondary combustion chamber 34. If desired, depending upon the nature of the waste material, the timer 54 may be arranged to shut off the fan 46 for a short adjustable period of time (for example about 50 seconds) at an adjustable predetermined period of time after commencement of combustion (for example about 5 minutes) so that combustion gases from the primary combustion chamber 14 can pass straight up the chimney 18 to further improve combustion in the primary combustion chamber 14.

In the event, continued operation of the fan 46 (or recommencement of operation if the procedure described above is followed) causes the combustion gases to be further burned in the secondary combustion chamber 34 with the aid of oxygen supplied thereto through the pipe 36, with such secondary combustion being sufficient to cause a flame which may extend throughout the length of the housing extension 32 and towards the heat exchanger 38.

In other words, at this stage, the temperature of the combustion gases passing from the primary combustion chamber 14 into the secondary combustion chamber 34 is sufficiently high to cause such secondary combustion to take place. Thus, hot combustion gases are drawn through the heat exchanger 38 to heat the air or water flowing therethrough. The heated air or water may of course be used elsewhere for any convenient heating purpose, e.g. for heating a building such as a home or farm building.

The combustion operation continued with the fan 46 operating and the auger 20 supplying further waste material to the primary combustion chamber 14 until the air or water leaving the heat exchanger 38 has reached a predetermined temperature as dictated by a thermostat 56. The thermostat 56 then de-activates the auger 20 so that no more waste material is fed to the primary combustion chamber 14 and the timer 54 operates to switch off the fan 46 at the end of a predetermined time, say 30 minutes, to burn up the remainder of the waste material in the primary combustion chamber 14. The switching off of the fan 46 causes the damper 50 to open so that any remaining combustion gases pass from the primary combustion chamber 14 up through the chimney 18 to the atmosphere.

If desired, a second thermostat (not shown) set at a higher temperature than the thermostat 56 may be provided in the heat exchanger 38 to switch off the fan 46 earlier than the predetermined time if the air or water leaving the heat exchanger 38 becomes too hot.

FIG. 2 shows another embodiment of the invention in which the same reference numerals are used for the same or similar parts of the embodiments of FIG. 1. In the second embodiment, combustion gases passing through the heat exchanger 38 heat air which passes through the heat exchanger from the inlet 40 to the outlet 42, with a fan 60 being provided in the inlet 40 to pass air through the heat exchanger. Heated air from the outlet 42 passes into the upper portion of a corn drying barn 62, the corn to be dried being led down a pipe 64 into the upper portion of the barn where it is supported on a perforated support 66 a short distance below the roof 68. The hot air from the heat exchanger 38 passes upwardly through the perforated support 66 to dry the corn and then escapes to the atmosphere through vents 70.

In this embodiment, combustion gases passing through the fan 46 escape to the atmosphere through a separate chimney 71, instead of being passed into the chimney 18 as in the previous embodiment.

When dry, the corn is allowed to fall into the lower portion of the bin 68 by opening gates 72 in the perforated support 66.

With this embodiment, the oil burner 26 of the previous embodiment may be omitted, as may most of the automatic controls if desired. The waste material may be initially ignited by passing a small quantity of liquid fuel, such as diesel fuel, into the housing 12 through an appropriate opening (not shown), with the fuel consequently being ignited in any convenient manner. The fan 60 may be operated continually, and the fan 46 be actuated by a thermostat 73 in the outlet 42 to regulate the temperature of the air entering the barn 62. When the fan 46 is off, combustion gases from the housing 12 pass up the chimney 18 instead of through the heat exchanger 38 and fan 46.

FIG. 3 shows a third embodiment in which like reference numerals are again used for those parts which are the same or similar to those of the embodiment of FIG. 1. In this third embodiment, the heat exchanger 38 surrounds the primary and secondary combustion chambers 14, 34, the second combustion chamber 34 being located below the primary combustion chamber 14. Also, separate concentric chimneys 18a, 18b are provided for the primary combustion chamber 14 and the outlet of the fan 46 respectively. When the fan 46 is operating, combustion gases passing up the chimney 18 may heat air passing down the chimney 18b into the primary combustion chamber 14 to aid combustion of the waste material therein.

It will thus be seen that the present invention provides apparatus for efficiently burning waste material and also for effectively controlling utilization of the heat of combustion.

Other embodiments of the invention will be readily apparent to a person skilled in the art, the scope of the invention being defined in the appended claims.

What I claim as new and desire to protect by Letters Patent of the United States is:

1. Apparatus for burning material and utilizing the heat of said burning, comprising a primary combustion chamber having an upper portion vented to the atmosphere, means for feeding said material into the primary combustion chamber, a secondary combustion chamber in communication with a lower portion of the primary combustion chamber, means for supplying air into the secondary combustion chamber, fan means operable to draw air from the atmosphere into the upper portion of the primary combustion chamber and to draw combustion gases downwardly through burning waste material in the primary combustion chamber to cause further combustion of the combustion gases in the secondary combustion chamber by air supplied thereto, with combustion gases from the primary combustion chamber venting to the atmosphere from the upper portion of the primary combustion chamber when the fan means is inoperative.

2. Apparatus according to claim 1 including heat exchanger means in communication with the secondary combustion chamber, said fan means when operating also causing combustion gases from the secondary combustion chamber to pass through the heat exchanger means.

3. Apparatus according to claim 1 including a chimney extending upwardly from the upper portion of the primary combustion chamber, and means for feeding the waste material being operable to feed the waste material into the chimney for subsequent fall into the primary combustion chamber.

4. Apparatus according to claim 1 including a perforated grate defining a bottom portion of the primary combustion chamber.

5. Apparatus according to claim 1 including a first chimney extending upwardly from the upper portion of the primary combustion chamber and operable to supply air to the primary combustion chamber when the fan means is operating and a second chimney surrounding the first chimney and extending from the fan means to cause air passed through the heat exchanger means by the fan means to pass up the second chimney and heat air passing down the first chimney into the primary combustion chamber.

* * * * *